(12) United States Patent
Tsou et al.

(10) Patent No.: US 7,709,575 B2
(45) Date of Patent: *May 4, 2010

(54) METHOD FOR CONTROLLING DISPERSION SIZE OF ELASTOMER IN THERMOPLASTIC ELASTOMER COMPOSITION

(75) Inventors: Andy Haishung Tsou, Houston, TX (US); Yoshihiro Soeda, Hiratsuka (JP); Yuichi Hara, Hiratsuka (JP)

(73) Assignees: The Yokohama Rubber Co., Ltd., Tokyo (JP); ExxonMobil Chemical Patents Inc., Houston, TX (US)

( * ) Notice: Subject to any disclaimer, the term of this patent is extended or adjusted under 35 U.S.C. 154(b) by 925 days.

This patent is subject to a terminal disclaimer.

(21) Appl. No.: 10/548,257

(22) PCT Filed: Mar. 6, 2003

(86) PCT No.: PCT/US03/06699

§ 371 (c)(1),
(2), (4) Date: May 18, 2006

(87) PCT Pub. No.: WO2004/081107

PCT Pub. Date: Sep. 23, 2004

(65) Prior Publication Data

US 2006/0223941 A1    Oct. 5, 2006

(51) Int. Cl.
C08F 8/30        (2006.01)
C08L 77/00       (2006.01)

(52) U.S. Cl. .................. 525/178; 525/179; 525/180; 525/184

(58) Field of Classification Search ............ 525/178, 525/179, 180, 184
See application file for complete search history.

(56) References Cited

U.S. PATENT DOCUMENTS

| 5,244,961 A | 9/1993 | Yu et al. |
| 5,910,544 A * | 6/1999 | Ozawa et al. ............... 525/178 |
| 6,013,727 A * | 1/2000 | Dharmarajan et al. ......... 525/72 |

FOREIGN PATENT DOCUMENTS

| EP | 0 857 761 A1 | 8/1998 |
| EP | 0 722 850 B1 | 5/1999 |
| EP | 0 969 039 A1 | 1/2000 |
| JP | 11302455 | 11/1999 |
| RU | 2063988 | 7/1996 |
| RU | 2107702 | 3/1998 |
| WO | WO-02/31048 A1 | 4/2002 |

OTHER PUBLICATIONS

PCT International Preliminary Examination Report for PCT/US03/06699 mailed on Feb. 9, 2005.
PCT International Search Report for PCT/US03/06699 mailed on Jun. 25, 2003.

* cited by examiner

*Primary Examiner*—Ana L Woodward
(74) *Attorney, Agent, or Firm*—Connolly Bove Lodge & Hutz LLP

(57) ABSTRACT

A method for controlling a dispersion size of an elastomer in a thermoplastic elastomer composition having improved durability and impermeability obtained by melt-mixing (A) a halogenated isobutylene elastomer, (B) polyamide and (C) a dispersion aid, and dynamically vulcanizing the resultant blend to form the dynamically vulcanized polymer blend, wherein the halogenated isobutylene elastomer is dispersed in the polyamide matrix at a volume-average dispersion diameter of less than 2.0 μm.

7 Claims, 2 Drawing Sheets

METHOD FOR CONTROLLING DISPERSION SIZE OF ELASTOMER IN THERMOPLASTIC ELASTOMER COMPOSITION

TECHNICAL FIELD

The present invention relates to a method for controlling a dispersion size of a thermoplastic elastomer composition having excellent heat resistance, durability and flexibility, while possessing superior air impermeability. In particular, the present invention relates to a method for controlling a dispersion size of elastomer in a thermoplastic elastomer composition having fine vulcanized elastomer dispersions therein.

BACKGROUND ART

EP722850B1 disclosed a low-permeability thermoplastic elastomer composition that is superior as a gas-barrier layer in pneumatic tires. This thermoplastic composition comprises a low-permeability thermoplastic matrix such as polyamides or blends of polyamides, in which a low-permeability rubber, such as brominated poly(isobutylene-co-p-methylstyrene) (i.e., BIMS), is dispersed. Subsequently, in both EP857761A1 and EP969039A1, viscosity ratio between the thermoplastic matrix and the rubber dispersion was specified as a function of the volume fraction ratio and independently to be close to one in order to achieve phase continuity in thermoplastic and fine rubber dispersions, respectively. Criticality of smaller rubber dispersions was recognized in EP969039A1 in these thermoplastic elastomers for delivering acceptable durability especially for their usage as innerliners in pneumatic tires.

SUMMARY OF THE INVENTION

Although the importance of the dispersion size in thermoplastic elastomers is recognized as related to the mechanical properties, specific size requirements for satisfactory cold-temperature fatigue resistance are not defined.

Accordingly, the object of the present invention is to provide a method for producing a thermoplastic elastomer composition having a controlled dispersion size of the elastomer in the elastomer composition having an excellent durability and impermeability.

In accordance with the present invention, there is provided a method for controlling a dispersion size of an elastomer in a thermoplastic elastomer composition having improved durability and impermeability comprising:

melt-mixing (A) a halogenated isobutylene elastomer, (B) polyamide and (C) a dispersion aid; and dynamically vulcanizing the resultant blend to obtain dynamically vulcanized polymer blend, wherein the halogenated isobutylene elastomer is dispersed in the polyamide matrix at a volume-average dispersion diameter Dv of 0.01 to 3 microns, more preferably, 0.01 to 2.5 microns, most preferably, 0.01 to 2 microns.

BRIEF DESCRIPTION OF THE DRAWINGS

The present invention will be better understood from the description set forth below with reference to the accompanying drawings, wherein.

DISCLOSURE OF INVENTION

Figure 1:
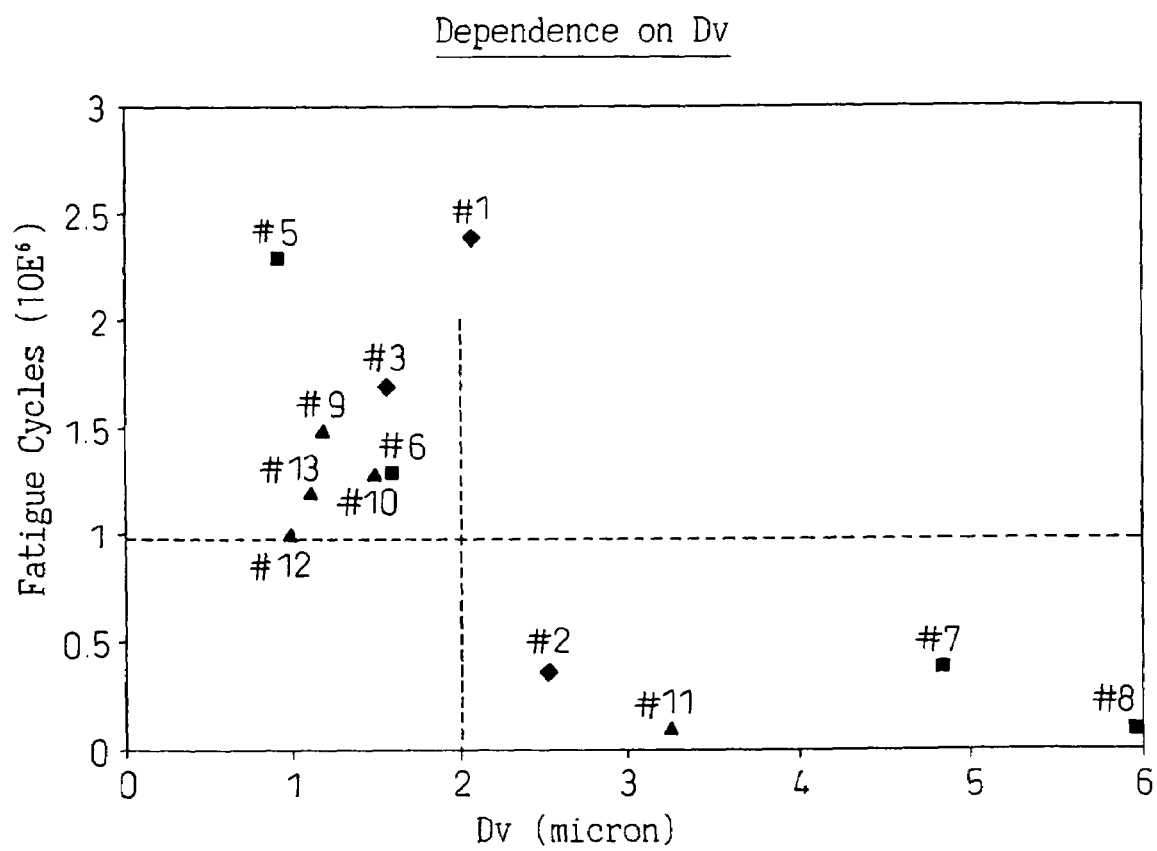
FIG. 1 shows a correlation between fatigue cycles and a volume average dispersion diameter Dv of BIMS.

In this specification and in the claims which follow, the singular forms "a", "an" and "the" include plural referents unless the context clearly dictates otherwise.

The present invention is to control the rubber dispersion size of halogenated isobutylene elastomer in polyamide, most particularly to have volume-average equivalent dispersion diameter of 0.01 to 3 microns, more preferably, 0.01 to 2.5 microns, most preferably, 0.01 to 2 microns. The preferred number-average dispersion diameter is less than 1 µm, more preferably less than 0.8 µm, even more preferably less than 0.5 µm. A thermoplastic elastomer having the specified dispersion size preferably has its tensile fatigue resistance at −20° C. greater than $1 \times 10^6$ cycles, more preferably more than $1.3 \times 10^6$ cycles.

The thermoplastic elastomer composition obtained by the present method is a blend of (A) a halogenated isobutylene elastomer, (B) a polyamide, and (C) a dispersion aid which is subjected to a dynamic vulcanization.

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

The dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

In a preferred embodiment the halogenated isobytylene elastomer component include copolymers of isobutylene and para-alkylstyrene, such as described in European Patent Application 0 344 021. The copolymers preferably have a substantially homogeneous compositional distribution. Preferred alkyl groups for the para-alkyl styrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene.

Suitable halogenated isobutylene elastomer components include copolymers (such as brominated isobutylene-paramethylstyrene copolymers) having a number average molecular weight Mn of at least about 25,000, preferably at least about 50,000, preferably at least about 75,000, preferably at least about 100,000, preferably at least about 150,000. The copolymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 25 or more, preferably 30 or more, more preferably 40 or more.

Preferred brominated copolymers of isobutylene and para-methylstyrene include those having 5 to 12 weight % para-methylstyrene, 0.3 to 1.8 mol % brominated para-methylstyrene, and a Mooney viscosity of 30 to 65 (1+4) at 125° C. (as measured by ASTM D 1646-99).

The halogenated isobutylene elastomer component (A) according to the present invention can be prepared from isobutylene and about 0.5 to 25% by weight, preferably about 2 to 20% by weight, based upon the total amount of the comonomers, of p-alkylstyrene, preferably p-methylstyrene, followed by the halogenation. The content of the halogen (e.g., Br and/or Cl, preferably Br) is preferably less than about 10% by weight, more preferably about 0.1 to about 7% by weight, based upon the total amount of the copolymer.

The copolymerization can be carried out in a known manner as described in, for example, European Patent Publication No. EP-34402/A published Nov. 29, 1989 and the halogenation can be carried out in a known method as described in, for example, U.S. Pat. No. 4,548,995.

The halogenated isobutylene elastomer preferably has the number-average molecular weight ($\overline{M}n$) of at least about 25,000, more preferably at least about 100,000 and a ratio of the weight-average molecular weight $\overline{M}w$ to the number-average molecular weight ($\overline{M}n$), i.e., $\overline{M}w/\overline{M}n$ of preferably less than about 10, more preferably less than about 8.

The polyamides usable in the present invention are thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6IP), Nylon 46, Nylon MXD6, Nylon 6/66 and the condensation product of 11-aminoundecanoic acid (Nylon 11). Nylon 6 (N6), Nylon 11 (N11), Nylon 12 (N12), a Nylon 6/66 copolymer (N6/66), Nylon 610 (N610), Nylon 46, Nylon MXD6, Nylon 69 and Nylon 612 (N612) may also be used. The copolymers thereof any blends thereof may also be used. Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention, with linear crystalline polyamides having a softening point or melting point between 160° C.-230° C. being preferred.

The amounts of the elastomer (A) and the polyamide (B) usable in the present invention are preferably 95 to 25 parts by weight and 5 to 75 parts by weight, more preferably 90 to 25 parts by weight and 10 to 75 parts by weight, respectively, provided that the total amount of the components (A) and (B) is 100 parts by weight.

According to the present invention, the dispersion aid are added as the component (C) in the composition. The dispersion aid (C) usable in the present invention includes reactive compatibilizers having a good affinity, i.e. specific chemical interactions, between polyamide and elastomer in the mixing step. Examples of such reactive compatibilizers are tertiary amines (e.g., N,N-dimethyllaurylamine, N,N-dimethylpalmitylamine, N,N-dimethylbehenylamine, N,N-dimethylallowalkylamine, N,N,-dimethyloleylamine), secondary diamines (e.g., N-(1,3-dimethylbutyl)-N'-phenyl-p-phenylenediamine) and any mixtures thereof.

The method for producing the thermoplastic elastomer composition in the present invention comprises mixing the halogenated isobutylene elastomer (A), the polyamide (B) and the dispersion aid (C) by a biaxial kneader/extruder etc. to disperse the elastomer (A) in the polyamide (B) forming the continuous phase. The reactive compatibilizers increase the viscosity of the elastomer during the mixing, whereby chemical reactions with these agents occur.

When vulcanizing the elastomer (A), a vulcanization agent is added, while kneading, and the elastomer component is dynamically vulcanized. Further, the various compounding agents (except vulcanization agent) for the elastomer and the polyamide may be added during the above kneading, but preferably are mixed in advance before the kneading. The kneader used for mixing the polyamide and the elastomer is not particularly limited. Examples thereof are a screw extruder, kneader, Banbury mixer, biaxial kneader/extruder, etc. Among these, it is preferable to use a biaxial kneader/extruder for the mixing of the thermoplastic resin and the elastomer and the dynamic vulcanization of the elastomer. Further, two or more types of kneaders may be used for successive kneading. As the conditions for the melting and kneading, the temperature should be at least the temperature where the polyamide melts. Further, the shear rate at the time of kneading is preferably 1000 to 7500 sec$^{-1}$. The time for the overall kneading is from 30 seconds to 10 minutes. Further, when adding a vulcanization agent, the vulcanization time after addition is preferably 15 seconds to 5 minutes. The elastomer composition produced by the above method is then extruded or calendered into a film. The method of forming the film may be a usual method of forming a film from a thermoplastic resin or thermoplastic elastomer.

The elastomer composition according to the present invention may contain, in addition to the above-mentioned essential ingredients, a vulcanization or cross-linking agent, a vulcanization or cross-linking accelerator, various types of oils, an antiaging agent, reinforcing agent, plasticizer, softening agent, or other various additives generally mixed into general rubbers. The compounds are mixed and vulcanized by general methods to make the composition which may then be used for vulcanization or cross-linking. The amounts of these additives added may be made the amounts generally added in the past so long as they do not run counter to the object of the present invention.

EXAMPLES

The present invention will now be further illustrated by, but is by no means limited to, the following Examples.

The following commercially available products were used for the components employed in the Examples 1. Resin Component Nylon 1: A blend of N11 (Rilsan BESN O TL) and N6/66 (Ube 5033B)

Nylon 2: N6/66 (CM6001FS)

Additive 1: Plasticizer; N-butylbenzenesulfonamide, Compatibilizer; AR201

Additive 2: Stabilizer; Irganox 1098, Tinuvin 622LD, and CuI

2. Rubber Component

BIMS: Brominated copolymer of isobutylene and para-methylstyrene sold under the tradename EXXPRO 89-4 by ExxonMobil Chemical Company having a mooney viscosity of about 45, approximately 5 weight % para-methylstyrene and about 0.75 mol % bromine Dispersion aid 1: DM16D; Hexadecyl dimethyl amine (Akzo Nobel)

Dispersion aid 2: 6PPD; N-(1,3-dimethylbutyl)-N'-phenyl-p-phenylenediamine

ZnO: Zinc oxide curative

St-acid: Stearic acid curative

ZnSt: Zinc sterate curative

MBTS: Benzyothiazyl disulfide

3. Anti-block Agent for Rubber Pelletization

Talc: hydrated magnesium silicate (Ciba)

ZnO: zinc oxide

Igafos: Igafos 168 antioxidant (Ciba)

The Test Methods Used for Evaluation of the Examples and Comparative Examples were as follows:

A) Measuring Volume Average Equivalent Dispersion Diameter and Number Average Equivalent Dispersion Diameter Tapping phase AFM was applied to evaluate dispersion sizes and size distributions in these films. All film samples were cryo-faced at −150° C. using a Reichert cryogenic microtome with diamond knives. Faced samples were stored in a desiccator under flowing dry nitrogen to be warmed up to ambient temperatures without moisture. Samples were run within 24 hours after cryo-facing using an AFM (DI-3000, Digital Instrument) in tapping mode with a rectangular 225-μm silicon cantilever. All tapping phase AFM micrographs were converted to TIFF format and processed using PHOTOSHOP (Adobe Systems) for image enhancement. All image measurements were performed using a commercial image process tool kit (Reindeer Games) as an attachment to PHOTOSHOP. Results of image measurements were written into text files for subsequent data processing by EXCEL (Microsoft). The number average dispersion diameter Dn is calculated as:

$$Dn = \Sigma(n_1 D_1)/\Sigma(n_1)$$

$D_1$ is the equivalent diameter of individual dispersion and $n_1$ is the number of the dispersion with an equivalent diameter of $D_1$. The volume average dispersion diameter Dv is expressed as:

$$Dv = \Sigma(n_1 D_1^4)/\Sigma(n_1 D_1^3)$$

with, n1 is the number of dispersion with equivalent diameter of D1.

B) Tensile Fatigue Cycles

Film and a carcass compound were laminated together with an adhesive and cured at 190° C. for 10 min. A JIS No. 2 dumbbell shape was then punched out and used for durability test at −20° C. at 6.67 Hz and 40% strain.

C) Tensile Mechanical Properties

All tensile tests are based on JIS K6251 "Tensile Test Method of Vulcanized Rubber".

Examples 1-4

BIMS was pre-compounded with curatives in a Banbury internal mixer and pelletized prior to its mixing with Nylon. Mixing and dynamic vulcanization of Nylon and BIMS were done in a twin-screw extruder at about 230° C. These mixtures were then cast or blown into films for fatigue testing. Prior to the fatigue testing, films were laminated onto a carcass compound and cured at 180° C. Dog-bone shape of testing specimens were then cut out from these laminates at 45-degree to the machine direction and tested for fatigue resistance at −20° C. and at 40% strain. A minimum requirement for good fatigue resistance is to have no cracks, breaks, or delaminations after 1 million cycles.

Figure 2:
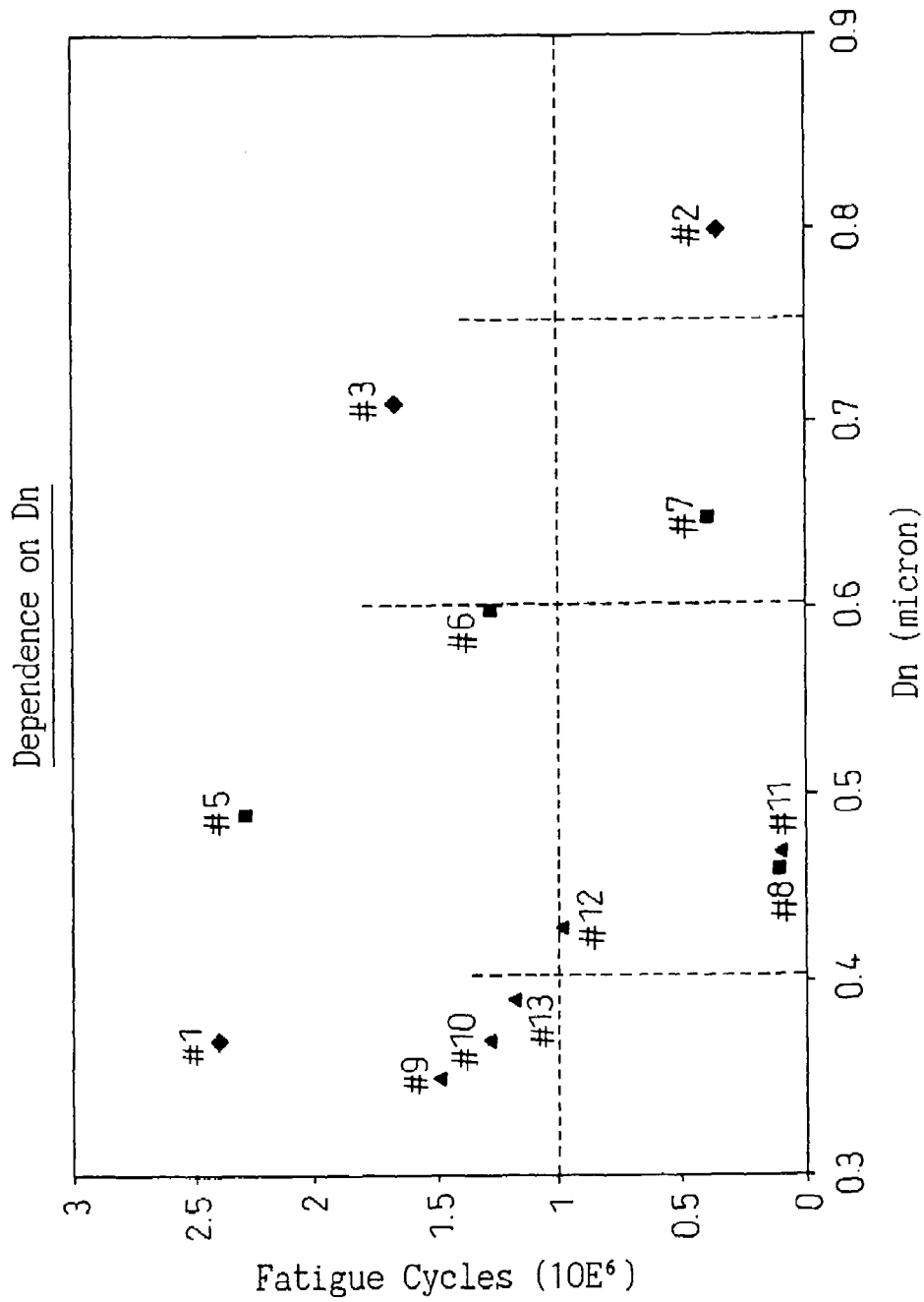
FIG. 2 shows a correlation between fatigue cycles and a number average dispersion diameter Dn of BIMS.

In Examples 1-4, Nylon 1 matrix with the addition of plasticizer and compatibilzer was used as shown in Table 1. Nylon 1 matrix with plasticizer has its viscosity closely match with that of BIMS. MBTS is a cure retarder that can react with benzylic bromine of BIMS and render it inactive. 6PPD could be a curative at the mixing temperature of 230° C. by crosslinking BIMS through benzylic bromines and, hence, removing them from reactive compatibilization. DM16D is a viscosity enhancer for BIMS that also react with benzylic bromine of BIMS but to a lesser degree. Both 6PPS and DM16D could also raise the BIMS viscosity and create viscosity mismatch between Nylon 1 and BIMS. As shown in Table 1, addition of MBTS could significantly disrupt the reactive compatibilization and, hence, enlarge the dispersion size, especially the larger dispersions, and detrimentally lower the fatigue resistance. The film sample containing 6PPD has such a low elongation to break value that it was not even tested for fatigue. The results are shown in FIGS. 1 and 2 (see #1-#3 for Examples 1-3, respectively).

TABLE 1

| | Example | | | |
|---|---|---|---|---|
| | 1 | 2*[1] | 3 | 4*[1] |
| Formulation (parts by weight) | | | | |
| BIMS | 100 | 100 | 100 | 100 |
| DM16D | 0 | 0 | 0.5 | 0 |
| MBTS | 0 | 1 | 0 | 0 |
| 6PPD | 0 | 0 | 0 | 0.5 |
| ZnO | 0.15 | 0.15 | 0.15 | 0.15 |
| St-acid | 0.60 | 0.60 | 0.60 | 0.60 |
| ZnSt | 0.30 | 0.30 | 0.30 | 0.30 |
| Nylon 1 | 68 | 68 | 68 | 68 |
| Additive 1*[2] | 21 | 21 | 21 | 21 |
| Additive 2*[3] | 0.5 | 0.5 | 0.5 | 0.5 |
| Physical Properties | | | | |
| −20° C. Strength (MPa)*[4] | 38.8 | 33.1 | 34.3 | 22.3 |
| −20° C. Elongation (%)*[4] | 443 | 412 | 456 | 343 |
| 25° C. Strength (MPa)*[4] | 16.9 | 15.5 | 21.3 | 10.1 |
| 25° C. Elongation (%)*[4] | 377 | 376 | 442 | 283 |
| 60° C. Strength (MPa)*[4] | 12.6 | 11.4 | 15.7 | 8.0 |
| 60° C. Elongation (%)*[4] | 347 | 338 | 395 | 278 |
| Dn (μm) | 0.37 | 0.8 | 0.71 | 0.68 |
| Dv (μm) | 2.07 | 2.52 | 1.57 | 3.74 |
| Fatigue cycles (×10$^6$) | 1.3-3.5 | 0.37 | 1.3-2.0 | NM*[5] |

*[1]Comparative Examples
*[2]Plasticizer
*[3]Antioxidant
*[4]All tensile results are reported as averages of measurements along the machine and transverse directions.
*[5]not measured due to poor film quality and low strengths.

Examples 5-8

In Examples 5 to 8, Nylon 1 matrix was used but without the plasticizer. With addition of 0.5 phr DM16D, BIMS viscosity could be closed matched to that of Nylon 1. Further increases in DM16D content could affect not just the viscosity matching but also the reactive compatibilization between Nylon and BIMS. As indicated in Table 2, the progressively increasing BIMS content leads to the increase in volume average dispersion size and the decrease in fatigue resistance. The results are shown in FIGS. 1 and 2 (see #5-#8 for Examples 5-8, respectively).

TABLE 2

|  | Example | | | |
|---|---|---|---|---|
|  | 5 | 6 | 7*1 | 8*1 |
| Formulation (parts by weight) | | | | |
| BIMS | 100 | 100 | 100 | 100 |
| DM16D | 0.5 | 1.0 | 2.0 | 3.0 |
| ZnO | 0.15 | 0.15 | 0.15 | 0.15 |
| St-acid | 0.60 | 0.60 | 0.60 | 0.60 |
| ZnSt | 0.30 | 0.30 | 0.30 | 0.30 |
| Nylon 1 | 95 | 95 | 95 | 95 |
| Additive 2*2 | 0.7 | 0.7 | 0.7 | 0.7 |
| Physical Properties | | | | |
| Dn (μm) | 0.49 | 0.6 | 0.65 | 0.46 |
| Dv ((μm) | 0.91 | 1.6 | 4.85 | 5.96 |
| Fatigue cycles (×10^6) | 1.7-2.8 | 1.3 | 0.4 | 0.1 |

*1Comparative Examples
*2Antioxidant

Examples 9-13

In Examples 9-13, Nylon 2 matrix, without N11 and without plasticizer, was used. In blending with Nylon 2, viscosity modifier, such as DM16D and 6PPD, is required to provide good viscosity matching and fine BIMS rubber dispersions. The concentration used for the anti-blocking agents listed in Table 3 is 0.5 to 1 phr. As indicated in Table 3, using ZnO as the anti-blocking agent could significantly affect the dispersion size. This anti-blocking agent may act as curative and, hence, remove benzylic bromines from BIMS for the reactive compatibilization. The results clearly show the increase in volume average dispersion size and the decrease in fatigue resistance. The results are shown in FIGS. 1 and 2 (see #9-#13 for Examples 9-13, respectively).

TABLE 3

|  | Example | | | | |
|---|---|---|---|---|---|
|  | 9 | 10 | 11*1 | 12 | 13 |
| Formulation (parts by weight) | | | | | |
| BIMS | 100 | 100 | 100 | 100 | 100 |
| DM16D | 0 | 0 | 0 | 1.0 | 1.0 |
| 6PPD | 0.5 | 0.5 | 0.5 | 0 | 0 |
| Pelletization | Talc | Irgafos | ZnO | Talc | Irgafos |
| ZnO | 0.15 | 0.15 | 0.15 | 0.15 | 0.15 |
| St-acid | 0.60 | 0.60 | 0.60 | 0.60 | 0.60 |
| ZnSt | 0.30 | 0.30 | 0.30 | 0.30 | 0.30 |
| Nylon 2 | 98 | 98 | 98 | 98 | 98 |
| Additive 2*2 | 0.75 | 0.75 | 0.75 | 0.75 | 0.75 |

TABLE 3-continued

|  | Example | | | | |
|---|---|---|---|---|---|
|  | 9 | 10 | 11*1 | 12 | 13 |
| Physical Properties | | | | | |
| −20° C. Strength (MPa)*3 | 47.25 | 44.56 | 43.61 | 51.77 | 46.13 |
| −20° C. Elongation (%)*3 | 280 | 277 | 300 | 353 | 320 |
| 25° C. Strength (MPa)*3 | 31.97 | 32.14 | 27.17 | 35.72 | 33.03 |
| 25° C. Elongation (%)*3 | 320 | 313 | 313 | 343 | 350 |
| Dn (μm) | 0.35 | 0.37 | 0.47 | 0.43 | 0.39 |
| Dv (μm) | 1.19 | 1.50 | 3.27 | 0.99 | 1.10 |
| Fatigue cycles (×10^6) | 1.0-2.0 | 1.0-1.5 | 0.11 | 0.5-1.5 | 0.9-1.5 |

*1Comparative Examples
*2Antioxidant
*3All tensile test results are reported as averages of measurements along the machine and transverse directions.

The invention claimed is:

1. A method for controlling a dispersion size of an elastomer in a thermoplastic elastomer composition having improved durability and impermeability comprising:
   melt-mixing (A) a halogenated isobutylene elastomer; (B) polyamide and (C) a dispersion aid selected from a tertiary amine, and a mixture thereof with a secondary diamine, whereby the melt-mixing increases the viscosity of the halogenated isobutylene elastomer; and
   dynamically vulcanizing the resultant blend to obtain the dynamically vulcanized polymer blend
   wherein the halogenated isobutylene elastomer is dispersed in the polyamide matrix at a volume-average dispersion diameter Dv of less than 2.0 μm.

2. A method as claimed in claim 1, wherein the amount of the halogenated isobutylene elastomer (A) is 95 to 25 parts by weight and the amount of the polyamide (B) is 5 to 75 parts by weight, the total amount of the halogenated isobutylene elastomer (A) and polyamide (B) is 100 parts by weight.

3. A method as claimed in claim 1, wherein the amount of the dispersion aid (C) is 0.1 to 50 parts by weight, based upon 100 parts by weight of the halogenated isobutylene elastomer.

4. A method as claimed in claim 1, wherein the halogenated isobutylene elastomer is brominated poly(isobutylene-co-p-methylstyrene).

5. A method as claimed in claim 1, wherein the polyamide is at least one member selected from the group consisting of Nylon 6, Nylon 66, Nylon 11, Nylon 69, Nylon 12, Nylon 610, Nylon 612, Nylon 46, Nylon MXD6, Nylon 6/66, and the copolymers thereof.

6. A method as claimed in claim 1, wherein the number-average equivalent diameter Dn of the dispersed halogenated isobutylene elastomer is less than 1 μm.

7. A method as claimed in claim 1, wherein the dispersion aid is a tertiary amine.

* * * * *